United States Patent
Kolahi

(10) Patent No.: US 8,143,894 B2
(45) Date of Patent: Mar. 27, 2012

(54) METHOD FOR OPERATING A RESONANCE MEASURING SYSTEM AND A RESONANCE MEASURING SYSTEM

(75) Inventor: Kourosh Kolahi, Duisburg (DE)

(73) Assignee: Krohne Messtechnik GmbH, Duisburg (DE)

( * ) Notice: Subject to any disclaimer, the term of this patent is extended or adjusted under 35 U.S.C. 154(b) by 434 days.

(21) Appl. No.: 12/544,370

(22) Filed: Aug. 20, 2009

(65) Prior Publication Data

US 2010/0139416 A1 Jun. 10, 2010

(30) Foreign Application Priority Data

Aug. 21, 2008 (DE) .................. 10 2008 039 012

(51) Int. Cl.
*G01V 3/00* (2006.01)
(52) U.S. Cl. ................... 324/318; 324/307
(58) Field of Classification Search ........... 324/300–322
See application file for complete search history.

(56) References Cited

U.S. PATENT DOCUMENTS

| | | | |
|---|---|---|---|
| 6,249,752 B1 | 6/2001 | Cunningham et al. | |
| 6,584,413 B1 * | 6/2003 | Keenan et al. | 702/28 |
| 6,675,106 B1 * | 1/2004 | Keenan et al. | 702/28 |
| 6,882,085 B2 * | 4/2005 | Komoda et al. | 310/323.12 |
| 7,272,265 B2 * | 9/2007 | Kouri et al. | 382/260 |

OTHER PUBLICATIONS

Ralf Storm, Lourosh Kolahi, and Helmut Röck,, Model-Based Correction of Coriolis Mass Flowmeters, IEEE Transactions on Instrumentation and Measurement, vol. 51, No. 4, Aug. 2002, pp. 605-610.

* cited by examiner

*Primary Examiner* — Dixomara Vargas
(74) *Attorney, Agent, or Firm* — Roberts Mlotkowski Safran & Cole, P.C.; David S. Safran

(57) ABSTRACT

A method for operating a resonance measuring system, in particular a Coriolis mass flowmeter, an oscillation element is excited to oscillation and the oscillations of the oscillation element are detected by an oscillation sensor and are formed as at least one response signal of a respective eigenform. Orthogonal projection components of the response signal are created, at least a first value corresponding to an eigenfrequency of the resonance measuring system is determined with at least a part of the alternating components of the projection components, at least a second value corresponding to the eigenfrequency of the resonance measuring system is determined with at least a part of the constant components of the projection components and the first and the second value correspondents are used for exciting the resonance measuring system with at least one control in at least one control loop in the eigenform corresponding to the eigenfrequency.

20 Claims, 4 Drawing Sheets

METHOD FOR OPERATING A RESONANCE MEASURING SYSTEM AND A RESONANCE MEASURING SYSTEM

BACKGROUND OF THE INVENTION

1. Field of Invention

The invention relates to a method for operating a resonance measuring system, in particular, a Coriolis mass flowmeter, wherein the resonance measuring system includes at least one oscillation element interactive with a process, at least one oscillation driver and at least one oscillation sensor, wherein the oscillation element is excited to oscillation in at least one eigenform with known excitation signals $F_i(t)$ by the oscillation driver and the oscillation element is excited to oscillation with unknown excitation signals $W(t)$ by the process and the oscillations of the oscillation element are detected by the oscillation sensor and are formed as at least one response signal $y_i(t)$ of the respective eigenform. In addition, the invention relates to a resonance measuring system that is operated using such a method.

2. Description of Related Art

Resonance measuring systems of the type mentioned above have been known for years, not only in the form of Coriolis mass flow meters, but also in density-measuring devices or level monitors using the tuning fork principle, in quartz scales and band viscometers, among other things. These resonance measuring systems are connected with a process, wherein the process and the resonance measuring system are interactive. In the exemplary Coriolis mass flowmeter, the process consists of a medium flowing through the oscillation element—Coriolis measuring tube, wherein the actual measurement of significant interest is the mass flow through the oscillation element. The influence of the process through the oscillation element—or, more generally, through the resonance measuring system—is usually negligible. The eigenfrequencies of the resonance measuring system, or, respectively the oscillation element are, moreover, of particular importance because preferred working points of the resonance measuring system are placed at eigenfrequencies of the measuring tube in order to be able to imprint the necessary oscillations for induction of Coriolis forces at a minimal energy input.

Here, and in the following, it is of particular interest that, in a Coriolis mass flowmeter, further additional information, namely information about the density of the fluid of the flowing medium, is encoded in the eigenfrequencies of the oscillation element.

In the following, resonance measuring systems are covered using the example of Coriolis mass flowmeters, but it should be understood as not being limited to Coriolis mass flowmeters. Such systems are generally termed resonance measuring systems, in which information about the determining process variables (indicators) is encoded in the eigenfrequencies and/or such systems in which the working points are placed at the eigenfrequencies of the measuring system. The further developments described in the following can be used on all systems subject to this definition.

The oscillation element of the resonance measuring system is generally excited to oscillation in an eigenform using a known excitation signal $F_i(t)$—or using multiple known excitation signals $F_i(t)$. The number of excitation signals required is dependent on the eigenform to be excited and from the number and placement of oscillation drivers along the oscillation element. For simplicity, generally one excitation signal $F_i(t)$ will be mentioned, but there could always be multiple excitation signals. On this note, the oscillations of the oscillation element are detected with one or with multiple oscillation sensors, which leads to one response signal or to multiple response signals; in the following, for simplicity, usually just one response signal will be mentioned, whereby—as mentioned above—there could also always be multiple response signals. In both cases, this is not to be understood as limiting.

The known excitation signal $F_i(t)$ can be called known insofar as that it is created, for example, by a conventionally used control. This excitation signal is often a harmonic signal, i.e., e.g., a sinusoidal force stimulus by means of the oscillation driver. In addition to the known, imprinted excitation signals $F_i(t)$, the process influences the oscillation element. This influence occurs, on the one hand, via changes in the parameters of the oscillation elements (parametric excitation), and on the other hand, via the excitation of the oscillations elements using unknown excitation signals $W(t)$.

Known mass flowmeters, which work according to the Coriolis principle, are characterized by a high accuracy and reliability in a one-phase flow mode—i.e., flow of a physically homogenous medium. However, this does not hold true for multi-phase flows. A multi-phase flow is, in general, a flow that is composed of at least two phases having different physical characteristics. Here, the phases could be either of the same or of different materials. Homogenous and spatially limited areas are signified as phases. Some examples are liquid-solid flow, gas-liquid flow, gas-solid flow, water-steam flow or water-air flow. Flows that, for example, occur in filling, emptying, process-starting and switching of valves are to be understood, here, as multi-phase flows.

In using multi-phase flows, considerable measuring errors occur. The essential cause, there, is the occurrence of an asymmetrical filling of the measuring tube during flow, which leads to a rapid fluctuation of the resonance frequency, as well as the occurrence and cessation of secondary flows in the measuring tube, which cause a quick attenuation at occurrence and a swift disattenuation at cessation. Generally, secondary flows are caused by differing densities of the flow phases.

A loss of the working point occurs in current, relatively slow—based on the speed of the instationariness of the flow—operating and controlling modes due to quick attenuation and disattenuation of the measuring tube as a result of an instationary flow and a simultaneously rapid change of the resonance frequency. Then, the maximum available output is often not enough to maintain the oscillations of the measuring tube. The result is that no Coriolis forces can be induced, whereby the measurability of the mass flow is lost. The drive power cannot be arbitrarily increased and is actually limited in existing resonance measuring systems; on the one hand, for the purpose of explosion protection, so that not too much energy is accumulated in the system, and on the other hand, so that no unfavorably high oscillation amplitudes occur in the case of interruption of the multi-phase flow.

Above all, the positioning of the working point in resonance measuring systems having poorly damped eigenforms is problematic as, e.g., in many Coriolis mass flowmeters, in which a resonance increase of the measuring tube oscillation can exist that is higher than a magnitude of three. This clarifies the high requirements that are to be placed on the adaptation of the excitation signal. The loss of the working point is associated with a restart—partly time-consuming and energy demanding—of a resonance measuring system.

Furthermore, the loss of the working point results in that the process variables of interest related to the eigenfrequency are no longer known, so that, here, another abrupt loss of information exists.

SUMMARY OF THE INVENTION

The object of the present invention is to avoid the identified disadvantages—at least partially—in the known method for operating resonance measuring systems, in particular, to provide such a method that makes possible a quick adjustment and correction of the resonance measuring system at the—time-variant—resonance working point.

The method according to the invention for operating a resonance measuring system in which the object derived and described above is solved, is first and essentially wherein orthogonal projection components of the response signal are created by projecting the response signal $y_i(t)$ onto an orthogonal frame of reference, at least a first value corresponding to the eigenfrequency $f_{0i}$ of the resonance measuring system is determined with at least a part of the alternating components of the projection components, at least a second value corresponding to the eigenfrequency $f_{0i}$ of the resonance measuring system is determined with at least a part of the constant components of the projection components and the first and the second value corresponding to the eigenfrequency $f_{0i}$ of the resonance measuring system are used for exciting the resonance measuring system with at least one control in at least one control loop in the eigenform corresponding to the eigenfrequency $f_{0i}$.

According to the invention, in determining the eigenfrequency in resonance measuring systems and in adjusting and correcting the possible time-variant working point, it is provided to simultaneously use two information sources in the determination of the eigenfrequency of the resonance measuring system in the respective eigenform, wherein an important advantage is based on the fact that both used information sources have different speeds and can be determined exactly in different excitation states of the resonance measuring system. The simultaneous determination of two values for the eigenfrequency in different ways allows for a safer, quicker and more exact determination of the eigenfrequency compared to using just one method alone. It is easily possible to obtain different parts of the response signal $y_i(t)$ by projecting the response signal onto an orthogonal frame of reference, as is known, for example, from communications engineering in the generation and analysis of quadrature components. The determined values of the eigenfrequencies can then be used in an arbitrary control for exciting the resonance measuring system at the eigenform of interest.

According to a preferred embodiment of the invention, the control is implemented in that the first determined value corresponding to the eigenfrequency $f_{0i}$ is used for exciting the resonance measuring system with a first control in a first control loop in the correspondent eigenform and the second determined value corresponding to the eigenfrequency $f_{0i}$ is used for exciting the resonance measuring system with a second control in a second control loop in the correspondent eigenform. In an alternative embodiment, the control is realized as a multivariable control, in which no separate, decoupled controller or, respectively control loop exists.

According to the invention, it has been revealed that the excitation of the resonance measuring system by the unknown excitation signal occurs broadband, namely through the noise of the process; here, it is a matter of additive process excitation. The unknown excitation signals are reflected in the alternating components of the projection components of the response signal, wherein, due to its resonance characteristics—bandpass—, the resonance measuring system primarily transmits such signal components that are near its eigenfrequencies, so that the eigenfrequencies occur directly as a parameter in the output signal—or, respectively, in the output signals—and can be extracted directly from this without time-intensive search processes. The use of the alternating components of the projection components is, thus, a direct method, which works quickly in the entire frequency range of interest. The broadband—and normally disturbing—excitation of the resonance measuring system by the process is, thus, presently used in order to obtain information about the—time-variant—value of interest for the eigenfrequencies.

The constant components of the projection components of the response signal $y_i(t)$ are reflected, above all, in the parts of the response signal $y_i(t)$ that are caused by the excitation of the resonance measuring system with known excitation signals $F_i(t)$. In this second control, above all, the relation is made use of that a certain response phase arises between the known excitation signal $F_i(t)$ and the response signal $y_i(t)$ of the respective eigenform. For example, when the resonance measuring system is considered a second order system, it is known that the response signal and the excitation signal experience a phase shift of 180° total when the—harmonic—excitation signal passes through the entire frequency range. The phase shift between the known excitation signal $F_i(t)$ and the response signal $y_i(t)$ indirectly permits an inference to the eigenfrequency of the system.

In implementing the method, the value for the eigenfrequency $f_{0i}$ of the respective eigenform of the resonance measuring system is automatically determined, the value for the eigenfrequency $f_{0i}$ of the respective eigenform in the adjusted state of the resonance measuring system is preferably determined from the resulting correcting variables of the resonance measuring system, in particular from a merged correcting variable.

For determining the eigenfrequency according to this method, the resonance measuring system is preferably excited to forced oscillation with a generated and known excitation signal and the phase between the known excitation signal $F_i(t)$ and the response signal $y_i(t)$ is controlled at a predetermined value that characterizes the value of the eigenfrequency of interest of the eigenform. The determination of the eigenfrequency thus results in a second closed control loop. This indirect method is very exact, however, it is very slow in poorly damped resonance measuring systems, since it is a search process in which the frequency of the known excitation signal is changed depending on the phase to the response signal. The rate of change of the frequency of the known excitation needs to be limited here, so that the resonance measuring system achieves a stationary state for each excitation frequency, i.e., any attempt at compensation after the change of the excitation frequency must be completed.

In the systems capable of being oscillated that are seen here—in particular, second order systems—the course of the phase of the frequency in a sound approximation is an arctan function having a steep course in the resonance range and a shallow course outside of the resonance range. Thus, the indirect method described above having excitation of the resonance measuring system via the known excitation signal near the eigenfrequency is very quick and exact due to the steep phase course, but is slow and imprecise regarding the frequency resolution and sensitivity outside of the resonance range in some distance from the eigenfrequency of interest.

According to a preferred embodiment of the invention, the first control and the second control are employed competitively and/or complementarily so that the process variables contained in the value for the eigenfrequency $f_{0i}$ are determined and/or the resonance measuring system is directed to the working point given by the value determined for the eigenfrequency $f_{0i}$. The first control and the second control are competitive insofar as that the first control as well as the second control determine the eigenfrequency of interest for themselves and carry out the excitation of the resonance measuring system at the correspondent eigenform; in this sense, the first control and the second control are redundant and, thus, competitive.

The first control and the second control, however, act complementarily to one another since they have different sensitivities over the entire frequency range. As has been explained above, the sensibility of the direct method remains constant using the alternating components of the projection components of the response signal, whereas, in evaluating the constant components of the projection components of the response signal $y_i(t)$, the sensibility of the of the indirect method is very small outside of the resonance range of the resonance measuring system and very large within the resonance range, so that, in a combined use of both methods, the direct method prevails outside of the resonance range and the indirect method prevails inside of the resonance range. The first control and the second control complement one another and can, thus, be complementarily merged.

In a preferred embodiment of the method according to the invention, the values $f_{0i}$ of the eigenfrequencies of the respective eigenforms are determined based on a model using the projection components of the response signal $y_i(t)$.

The oscillation behavior of a resonance measuring system can be mathematically fundamentally described by a second order Lagrangian, wherein each eigenform of interest of the oscillations represents a generalized degree of freedom. In Coriolis mass flowmeters, an oscillation in the first eigenform corresponds, for example, to the equiphase translatory movements of the masses of the measuring or, respectively carrier tube. One rotation of the masses around the central point of the measuring tube corresponds to an oscillation in the second eigenform. The differential equation system for all considered n eigenforms is $$M\ddot{x}(t)+D\dot{x}(t)+Cx(t)=F(t), \quad \text{(Equation 1)}$$

wherein M is the inertia tensor matrix, D the damping matrix, C the rigidity matrix and F the incitement of force.

The use of Fourier transforms in Equation 1 for the starting conditions $x(0)=0$, causes an algebraization of the movement equations. If, in detecting the movement of the resonance measuring system, e.g. speed sensors (e.g. magnet/magnetic coil) are used for measuring the movement, then $\underline{x}(t)$ is the measured response vector and the frequency response of the resonance measuring system is $$G(j\omega) = \frac{V(j\omega)}{F(j\omega)} = \frac{j\omega}{-\omega^2 M + j\omega D + C}. \quad \text{(Equation 2)}$$

The same holds true when oscillation sensors or acceleration sensors are used.

Possible coupling of the eigenforms are characterized by elements of the matrices M, D, and C outside of the main diagonal. The parameters and their physical importance, in particular for coupling, can be visualized using the written movement equations for the first and the second eigenform of a Coriolis measuring tube:

$$m_1\ddot{x}_1+d_1\dot{x}_1+c_1x_1+k_{b21}\ddot{x}_2+k_{v21}\dot{x}_2+k_{cor21}\dot{x}_2+k_{s21}x_2=F_1$$

$$k_{b12}\ddot{x}_1+k_{v12}\dot{x}_1+k_{cor12}\dot{x}_1+k_{s12}x_1+m_2\ddot{x}_2+d_2\dot{x}_2+c_2x_2=F_2 \quad \text{(Equation 3)}$$

Here, $m_i$ is the oscillation mass of the respective eigenform, $d_i$ the damping constant of the respective eigenform, $c_i$ the spring constant of the respective eigenform, $k_{xxx}$ acceleration, speed and off-coupling of the eigenforms ($k_{corxx}$ are speed proportional couplings that are proportional to mass flow) and $F_i$ is the excitation force of the respective eigenform.

The coupling of the eigenforms comes about either from the non-intended asymmetry of design or from the mass flow. They are formed from the differences of the oscillation masses and damping and spring constants of the measuring tube halves and are normally very small compared to the corresponding parameters $m_i$, $d_i$, $c_i$. In the present model, all couplings are set at null, which makes the matrices M, D, and C into diagonal matrices. Then, the individual eigenforms can be described by a second degree transfer function. The transfer function of the i-ten eigenform is $$G_i(s) = \frac{k_i s}{s^2 + 2\omega_{0i}d_i^* s + \omega_{0i}^2}. \quad \text{(Equation 4)}$$

This transfer function has three parameters for the respective eigenform i, which are determined via the spring constant $c_i$, the oscillation mass $m_i$ and the damping coefficient $d_i$. The conditional equation is:

$$k_i = \frac{1}{m_i}, \quad \omega_{0i} = \sqrt{\frac{c_i}{m_i}} \quad \text{and} \quad d_i^* = \frac{d_i}{2m\omega_{0i}}.$$

The parameter of the measuring tubes $m_i$ and $d_i$ change very quickly with the speed of the transience of the flow. Thus, a highly time-variant system exists corresponding to the change of the oscillation mass $m_i$ and the damping coefficient $d_i$. For the control within the method according to the invention, this means that the dynamics of measurement and control have to keep up with the dynamics of transience of flow, since otherwise, constant interruptions of the measurement of the process variables are inevitable.

For clarity, the model of the resonance measuring system is simplified in the eigenfrequency for purposes of measuring the eigenfrequency and the excitation of the oscillation element—Coriolis measuring tube—insofar that the behavior of the eigenform can be expressed by the uncoupled transfer function according to Equation 4. That is, the couplings between the present eigenforms are not explicitly taken into consideration in the description. This is allowable and makes sense, since the eigenforms are generally uncoupled from one another at the eigenfrequency.

The resonance measuring system is first examined at an excitation with known excitation signals, presently, namely at a harmonic excitation. Here:

$$m_i\ddot{x}_i+d_i\dot{x}_i+c_i x_i=F_i\cos(\omega_i t+\phi_{0i}) \quad \text{(Equation 5)}$$

having the starting conditions $x_i(t=0)=x_{i0}$ and $\dot{x}_i(t=0)=\dot{x}_{i0}$.

The solution by Equation 5 for the speed response of the eigenforms is:

$$y_i(t) = \left[P_i\cos\left(\omega_{0i}\sqrt{1-D_i^2}\,t\right) + Q_i\sin\left(\omega_{0i}\sqrt{1-D_i^2}\,t\right)\right] \quad \text{(Equation 6)}$$

$$e^{-\omega_{0i}D_i t} + C_i\cos(\omega t) + E_i\sin(\omega t)$$

having

-continued $$P_i = \frac{\omega_i(\omega_{0i}^2 - \omega_i^2 - 4\omega_{0i}^2 D_i^2)F_i \sin(\varphi_{0i})}{m_i[\omega_i^4 + (4D_i^2 - 2)\omega_i^2\omega_{0i}^2 + \omega_{0i}^4]} + \dot{x}_{i0},$$

$$Q_i = -\frac{[\omega_{0i}^2\omega_i^2 + (2D_i^2 - 1)\omega_{0i}^4]F_i\cos(\varphi_{0i})}{m_i(\omega_{0i}\sqrt{1-D_1^2})[\omega_i^4 + (4D_i^2-2)\omega_i^2\omega_{0i}^2 + \omega_{0i}^4]} -$$

$$\frac{[\omega_{0i}^3\omega_i D_i(2D_i^2-3) + \omega_{0i}\omega_i^3 D_i]F_i\sin(\varphi_{0i})}{m_i(\omega_{0i}\sqrt{1-D_1^2})[\omega_i^4 + (4D_i^2-2)\omega_i^2\omega_{0i}^2 + \omega_{0i}^4]},-$$

$$\frac{\dot{x}_{i0}D_i + \omega_{0i}x_{i0}}{\sqrt{1-D_i^2}}$$

$$C_i = \frac{2\omega_i^2\omega_{0i}D_i F_i\cos(\varphi_{0i}) - \omega_i(\omega_{0i}^2 - \omega_i^2)F_i\sin(\varphi_{0i})}{m_i[\omega_i^4 + (4D_i^2-2)\omega_i^2\omega_{0i}^2 + \omega_{0i}^4]},$$

$$D_i = \frac{d_1}{2m_i\omega_{0i}}$$

and $$E_i = -\frac{2\omega_i^2\omega_{0i}D_i F_i\sin(\varphi_{0i}) - \omega_i(\omega_i^2-\omega_{0i}^2)F_i\cos(\varphi_{0i})}{m_i[\omega_i^4 + (4D_i^2-2)\omega_i^2\omega_{0i}^2 + \omega_{0i}^4]}.$$

In total, the following relation results, thus, from Equation 6

$$y_i(t) = A_i\sin(\omega_i t + \varphi_i) + \qquad \text{(Equation 7)}$$
$$B_i \cdot e^{-\omega_{0i}D_i t} \cdot \sin\left[\left(\omega_{0i}\sqrt{1-D_i^2}\right)t + \varphi_{\omega 0i}\right]$$

having $$A_i = \sqrt{E_i^2 + C_i^2}, \; B_i = \sqrt{P_i^2 + Q_i^2},$$

$$\varphi_i = \arctan\left(\frac{C_i}{E_i}\right), \; \varphi_{\omega 0i} = \arctan\left(\frac{P_i}{Q_i}\right).$$

The response signal of the eigenforms consists of the overlay of the damped resonance frequency signals and the known excitation signals or, respectively, a harmonic signal with the frequency of the excitation signal, when the oscillation element—the Coriolis measuring tube—is excited by a signal whose frequency is different than the respective resonance frequency of the eigenforms. The response signal obtains two frequencies, those of the excitation signal and the resonance location during transfer between two quasi-stationary states—for example, caused by changes of the parameters $c_i$, $m_i$ and $d_i$ due to the process (multiplicative process excitation).

Under the condition, that the damping of the eigenform is considerably smaller than one ($D_i \ll 1$), the following equation is true as a model for the speed response of the eigenforms in good approximation:

$$y_i(t) = A_i\sin(\omega_i t + \phi_i) + B_i \cdot e^{-\omega_{0i}D_i t}\cdot\sin(\omega_{0i}t + \phi_{\omega 0i}) \qquad \text{(Equation 8)}$$

In the quasi-stationary state, the phase $\phi_i$ between the known excitation signal and the response signal provides information about the value of the eigenfrequency of the respective eigenform. In the state transition, the second term containing damping in Equation 8 provides information about the value of the eigenfrequency of the respective eigenform. The phase $\phi_{\omega 0i}$ marks the beginning of the state transition from one to the other quasi-stationary state. For simplicity, it is placed at null in further examinations; the model forming the basis of the method according to the invention is simplified to:

$$y_i(t) = A_i\sin(\omega_i t + \phi_i) + B_i \cdot e^{-\omega_{0i}D_i t}\cdot\sin(\omega_{0i}t). \qquad \text{(Equation 9)}$$

For describing the behavior regarding unknown excitation signals from the process (additive process excitation) of the resonance measuring system or, respectively the oscillation element of the resonance measuring system, a mathematical formulation of the process noise is assumed as white noise W(t). White noise is extremely broadband by definition, namely possesses a constant power spectrum $S_w(f)$ over the frequency. The oscillation element acts as a bandpass on the excitation, so that a colored noise $S_n(f)$ of the start signal comes from the white noise of the "unknown" excitation signal having a maximum amplitude in the range of the resonance frequency of interest of the resonance measuring system. In the mathematical formulation, the following holds true for the capacity of the colored noise $$P_n = \int_0^\infty S_n(f)df = \int_0^\infty k|H(f)|^2 df = kB_{eq} \qquad \text{(Equation 10)}$$

having $$B_{eq} = \int_0^\infty |H(f)|^2 dF,$$

wherein W(t) is designated for white noise, $S_w(f)$ the spectral capacity of the white noise, H(f) the frequency response of the oscillation element, $V_n(t)$ the colored noise, $S_n(f)$ the spectral capacity of the colored noise, $P_n$ the capacity of the capacity of the colored noise and $B_{eq}$ the equivalent band width.

Due to the bandpass characteristics of the measuring tube having a very small bandwidth, a signal as response signal results whose frequency corresponds to the center frequency or, respectively the eigenfrequency of the measuring tube. In first approximation, the response signal can be described by a harmonic signal:

$$y_{iPro}(t) = B_{iPro}\sin(\omega_{0i}t). \qquad \text{(Equation 11)}$$

In addition to the additive process excitation, the multiplicative process excitation can also affect and be taken into consideration by the resonance measuring system. This is based on the changing of at least one parameter of the resonance measuring system and is thus partially also termed parametric excitation. It is assumed in the multiplicative process excitation that the oscillation element is energetic through the indirect method or through additive process excitation, i.e., at least one of the starting conditions in Equation 5 is not equal to zero. If a parameter $c_i$, $m_i$, or $d_i$ changes due to the process, Equation 5 can be solved with the starting conditions valid at the time of the change in parameters. The solution corresponds to Equation 7 with new parameters. The multiplicative process excitation results in a transition from one quasi-stationary state to another quasi-stationary state.

In summary, in a preferred embodiment of the method according to the invention, a second order linear differential equation is used as a model of the eigenforms of the resonance measuring system or, respectively, the eigenforms of the oscillation elements, in particular wherein a harmonic oscillation with an excitation frequency $f_i$ or, respectively, an angular excitation frequency $\omega_i$ is used as a known excitation signal, in particular wherein the unknown excitation signal W(t) is assumed as white noise and, in particular wherein, simplified as a model for the response signal $y_i(t)$ of the respective eigenmode, the following relation is used as a speed signal of the oscillation:

$$y_i(t) = A_i \sin(\omega_i t + \phi_i) + B_i \cdot e^{-\omega_{0i} D_i t} \cdot \sin(\omega_{0i} t) + B_{iPro} \sin(\omega_{0i} t) \quad \text{(Equation 12)}$$

here, $y_i(t)$ is the response signal of the $i^{th}$ eigenform of the oscillation element—Coriolis measuring tube—, formed from at least one signal of at least one oscillation sensor, the index i denotes the $i^{th}$ eigenform to be excited and evaluated, $\omega_i$ is the angular frequency of the generated excitation signal for the $i^{th}$ eigenform, $A_i$ is the resulting response amplitude for the generated and, thus, known excitation signal at the angular frequency $\omega_i$, $\phi_i$, is the response phase for the generated excitation at the angular frequency $\omega_i$, $B_i$ is a parameter of the measuring tube regarding the $i^{th}$ eigenform in the multiplicative process excitation, $\omega_{0i}$ is the angular eigenfrequency of the $i^{th}$ eigenform of the measuring tube, D, is the damping constant of the $i^{th}$ eigenform of the measuring tube and $B_{iPro}$ is a parameter of the measuring tube regarding the $i^{th}$ eigenform in additive process excitation. In Equation 12, the response of the generated excitation regarding the respective eigenform is expressed in a single frequency for the purpose of clarity. In other embodiments, the number of frequency components of the generated excitation regarding the respective eigenform can be higher.

In a preferred embodiment of the method according to the invention, two harmonic oscillations shifted by 90° are used as an orthogonal frame of reference with which the response signal $y_i(t)$ is multiplied for obtaining the orthogonal projection components $Re\{y_i\}, Im\{y_i\}$, wherein preferably one of the harmonic oscillations is derived from the known excitation signal $F_i(t)$ of the respective eigenform; the multiplication realizes the projection of the response signal in the orthogonal frame of reference.

In the concrete realization, for example, the present response signal, as the speed signal of the first and the second eigenform is multiplied by a sine signal and a cosine signal of the excitation frequency. In this case, the projection components of the response signal result from (with i=1, 2):

$$y_i(t)\sin(\omega_i t) = Re\{y_i\} \quad \text{(Equation 13)}$$
$$= A_i \sin(\omega_i t + \varphi_i)\sin(\omega_i t) +$$
$$(B_i e^{-\omega_{0i} D_i t} + B_{iPro})$$
$$\sin(\omega_{0i} t)\sin(\omega_i t)$$
$$= \frac{A_i}{2}[\cos(\varphi_i) - \cos(2\omega_i t + \varphi_i)] +$$
$$\frac{(B_i e^{-\omega_{0i} D_i t} + B_{iPro})}{2}$$
$$[\cos(\omega_{0i} - \omega_i)t - \cos(\omega_{0i} + \omega_i)t]$$

and $$y_i(t)\cos(\omega_i t) = Im\{y_i\} \quad \text{(Equation 14)}$$
$$= A_i \sin(\omega_i t + \varphi_i)\cos(\omega_i t) +$$
$$(B_i e^{-\omega_{0i} D_i t} + B_{iPro})\sin(\omega_{0i} t)\cos(\omega_i t)$$
$$= \frac{A_i}{2}[\sin(\varphi_i) - \sin(2\omega_i t + \varphi_i)] +$$
$$\frac{(B_i e^{-\omega_{0i} D_i t} + B_{iPro})}{2}$$
$$[\sin(\omega_{0i} - \omega_i)t - \sin(\omega_{0i} + \omega_i)t]$$

The projected components can be understood here as real and imaginary parts of a pointer in the complex plane, which is expressed by Re and Im in Equations 13 and 14.

The constant components of the projection components in Equations 13 and 14 contain indirect information encoded in the phase about the value of the eigenfrequency. Outside of the resonance range of the resonance measuring system, these constant components are small due to small oscillation amplitudes. The alternating components of the projection components carry direct information about the value of the eigenfrequency in their parameters. They can be used according to different methods for determining the value or, respectively the location of the eigenfrequency.

In a particularly preferred embodiment of the invention, an alternating component of the projection components ($Re\{y_i\}$, $Im\{y_i\}$) is obtained by high-pass filtering and/or low-pass filtering of the projection components ($Re\{y_i\}, Im\{y_i\}$) of the response signal $y_i(t)$. Preferably, the frequency components $\omega_{0i}+\omega_i$ and $2\omega_i$ are filtered out with a low-pass filter in Equations 13 and 14 in order to use the alternating components having the angular difference frequency $\omega_{0i}-\omega_i$ for determining the eigenfrequency. Thus, without consideration of the constant components, both Equations 13 and 14 become (filtered by a high-pass filter or because the constant components are negligible due to small oscillation amplitudes):

$$Re\{y_{iw}\} = \frac{(B_i e^{-\omega_{0i} D_i t} + B_{iPro})}{2}\cos(\omega_{0i} - \omega_i)t \quad \text{(Equation 13')}$$

and $$Im\{y_{iw}\} = \frac{(B_i e^{-\omega_0 D_i t} + B_{iPro})}{2}\sin(\omega_{0i} - \omega_i)t \quad \text{(Equation 14')}$$

The real and imaginary parts according to Equations 13' and 14' describe a complex-valued pointer $\underline{S}$, which rotates with an angular frequency of $\omega_{0i}-\omega_i$; the angular frequency is dependent on the angular eigenfrequency of interest:

$$\underline{S} = Re\{y_{iw}\} + jIm\{y_{iw}\}$$
$$= \frac{(B_i e^{-\omega_{0i} D_i t} + B_{iPro})}{2}[\cos(\omega_{0i} - \omega_i)t + j\sin(\omega_{0i} - \omega_1)t]$$

The basic idea is to infer the value of the angular eigenfrequency of the observed eigenform by determining the angular frequency $\omega_{0i}-\omega_i$ of the complex pointer. To this end, the phase shift $\phi_{Pro}$ of the pointer $\underline{S}$ is presently observed during the time $\Delta t$ between time terms $\overline{t}_1$ and $t_2$. Multiplication of the pointer $\underline{S}(t_1)$ and $\underline{S}^*(t_2)$ yield ($\underline{S}^*$ is the conjugated pointer $\underline{S}$):

$$\underline{S}(t_1) \cdot \underline{S}*(t_2) = [Re\{y_{iw}(t_1) + jIm\{y_{iw}(t_1)\}\}] \cdot$$
$$[Re\{y_{iw}(t_2) - jIm\{y_{iw}(t_2)\}]$$
$$= Re\{y_{iw}(t_1) \cdot Re\{y_{iw}(t_2) + Im\{y_{iw}(t_1) \cdot Im\{y_{iw}(t_2)\} +$$
$$j[Im\{y_{iw}(t_1) \cdot Re\{y_{iw}(t_2) - Re\{y_{iw}(t_1) \cdot Im\{y_{iw}(t_2)],$$

wherein the phase difference of the complex pointer can be directly determined therefrom:

$$\varphi_{Pro} = \arctan\left(\frac{Im\{y_{iw}(t_1) \cdot Re\{y_{iw}(t_2) - Re\{y_{iw}(t_1) \cdot Im\{y_{iw}(t_2)}{Re\{y_{iw}(t_1) \cdot Re\{y_{iw}(t_2) + Im\{y_{iw}(t_1) \cdot Im\{y_{iw}(t_2)}\right)$$

Inserting Equations 13' and 14' indirectly yields $$\varphi_{Pro} = \arctan\begin{pmatrix} \sin(\omega_{0i} - \omega_i)t_1 \cdot \cos(\omega_{0i} - \omega_i)t_2 - \\ \cos(\omega_{0i} - \omega_i)t_1 \cdot \sin(\omega_{0i} - \omega_i)t_2 \\ \hline \cos(\omega_{0i} - \omega_i)t_1 \cdot \cos(\omega_{0i} - \omega_i)t_2 + \\ \sin(\omega_{0i} - \omega_i)t_1 \cdot \sin(\omega_{0i} - \omega_i)t_2 \end{pmatrix}$$

or, respectively $$\varphi_{Pro} = \arctan\left(\frac{\sin(\omega_{0i} - \omega_i)(t_1 - t_2)}{\cos(\omega_{0i} - \omega_i)(t_1 - t_2)}\right)$$

With the relation $\phi_{Pro} = (\omega_{0i} - \omega_i)(t_1 - t_2)$, the sought eigenfrequency of the respective eigenform of the resonance measuring system results using the preceding Equations (Equation 15):

$$\varphi_{Pro} = \arctan\left(\frac{\sin(\omega_{0i} - \omega_i)(t_1 - t_2)}{\cos(\omega_{0i} - \omega_i)(t_1 - t_2)}\right)$$

With a suitable choice of time difference according to the following inequality $$t_1 - t_2 < \frac{\pi}{\omega_{0i} - \omega_i},$$

leaps in the phase calculation can be avoided.

In a further advantageous embodiment of the method according to the invention, the first control loop is designed as a frequency control loop and the following control difference is nullified using the approximation arctan(x)=x:

$$f_{0i} - f_i = \frac{1}{2\pi(t_1 - t_2)} \cdot \frac{\operatorname{Im}\{y_{iw}(t_1)\} \cdot \operatorname{Re}\{y_{iw}(t_2)\} - \operatorname{Re}\{y_{iw}(t_1)\} \cdot \operatorname{Im}\{y_{iw}(t_2)\}}{\operatorname{Re}\{y_{iw}(t_1)\} \cdot \operatorname{Re}\{y_{iw}(t_2)\} + \operatorname{Im}\{y_{iw}(t_1)\} \cdot \operatorname{Im}\{y_{iw}(t_2)\}}$$ (Equation 16)

Although a dynamic flaw of the determination of the eigenfrequency arises here, it disappears when the control difference is adjusted. The working frequency is controlled at the eigenfrequency via information from additive and multiplicative process excitement.

A further advantageous embodiment of the method according to the invention is characterized in that a respective constant component of the projection components (Re{$y_i$}, Im{$y_i$}) is obtained by low-pass filtering of the projection components (Re{$y_i$},Im{$y_i$}) of the response signal $y_i(t)$, the phase difference $\phi$ of the response signal $y_i(t)$ is obtained through the constant components of the projection components (Re{$y_i$},Im{$y_i$}) and the phase difference $\phi$ is nullified via the excitation frequency $f_i$ by the second control loop designed as phase control loop, so that the excitation frequency $f_i$ corresponds to the eigenfrequency $f_{0i}$ of the resonance measuring system.

According to a further method according to the invention, which is based on the examination of the constant components of the projection components of the output signal, if a respective constant component of the projection components (Re{$y_i$},Im{$y_i$}) is obtained by low-pass filtering of the projection components (Re{$y_i$},Im{$y_i$}) of the response signal $y_i(t)$, the phase shift $\phi_i$ of the response signal $y_i(t)$ is obtained through the constant component of the projection components (Re{$y_i$},Im{$y_i$}) and a value of the eigenfrequency $f_{0i}$ of the resonance measuring system is obtained from the phase shift $\phi_i$, in particular from the relations $$\operatorname{Re}\{y_{iG}\} = \frac{A_i}{2}\cos\varphi_i$$ (Equations 17a, 17b)

and $$\operatorname{Im}\{y_{iG}\} = \frac{A_i}{2}\sin\varphi_i,$$

$$\varphi_i = \arctan\left(\frac{\operatorname{Im}\{y_{iG}\}}{\operatorname{Re}\{y_{iG}\}}\right)$$ (Equation 18)

$$= \frac{\pi}{2} - \arctan\left(\frac{2\omega_{0i}D_i\omega_i}{\omega_{0i}^2 - \omega_i^2}\right)$$

The constant components according to Equation 17a, 17b result directly from Equations 13 and 14. This alternative can, in particular, be advantageously applied when the value for the damping constant of the system is already known, otherwise the value for the damping constant needs to be previously determined.

In the method according to the invention, different sources of information are used for determining the eigenfrequency of the resonance measuring system and applied in internal control loops for operating the resonance measuring system in the determined eigenfrequency. Preferably, the method is designed so that, in generating the excitation signal F(t), the control loop is decisive that has a greater sensitivity in the respective frequency range. In particular, it makes sense to design the method so that the first control loop outside of the resonance range of the respective eigenform of the resonance measuring system is decisive and the second control loop inside of the respective eigenform of the of the resonance range of the resonance measuring system is decisive. The correcting variables of the first control loop and the second control loop are merged by a signal generator using different functions, preferably by creating a summation signal from the correcting variables.

In a further preferred embodiment of the invention, the amplitude of the oscillation of the oscillation element of the resonance measuring system is controlled at a predetermined value by a third control loop, so that ample excitation of the resonance measuring system is always guaranteed and the amplitude can simultaneously be safely limited.

Furthermore, the invention relates to a resonance measuring system that is designed in such a manner that it can be operated by the method described above.

In detail, there are multiple possibilities for designing and further developing the method for operating a resonance measuring system according to the invention and the resonance measuring system according to the invention as will become apparent from the following description of preferred embodiments together with the accompanying drawings.

DETAILED DESCRIPTION OF THE INVENTION

Figure 1:
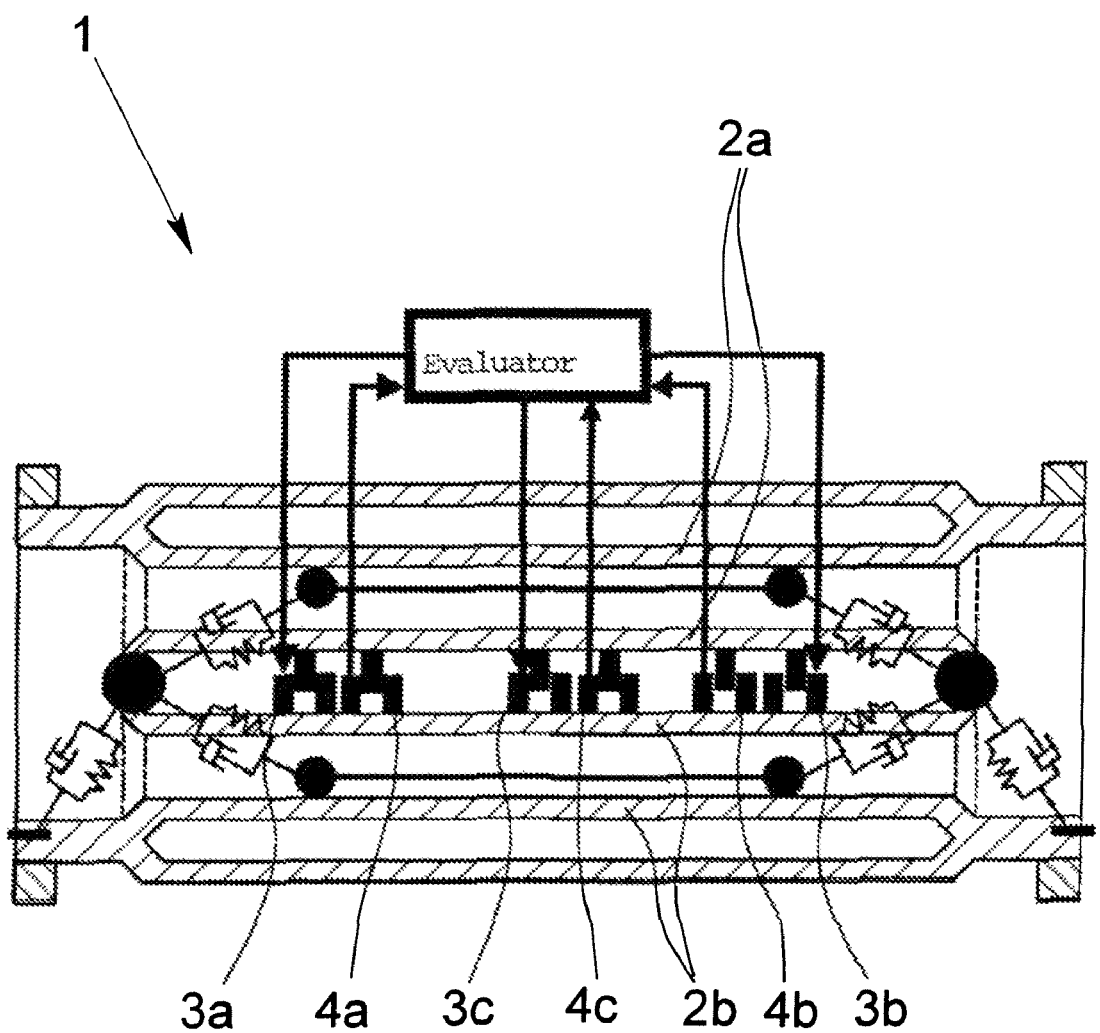
FIG. 1 is a schematic depiction of a resonance measuring system in the form of a Coriolis mass flowmeter with implied equivalent circuit variables for modeling.

FIG. 1 shows the schematic depiction of a Coriolis mass flowmeter that is representative here for the resonance measuring system 1 in question. At hand, the resonance measuring system 1 has two interactive oscillation elements 2a, 2b, three oscillation drivers 3a, 3b, 3c and three oscillation sensors 4a, 4b, 4c. The oscillation elements 2a, 2b are excited to oscillation in at least one eigenform by the oscillation driver 3a, 3b, 3c, normally with known excitation signals $F_i(t)$, wherein, in the case of oscillation elements 2a, 2b formed as Coriolis measuring tubes, a first eigenform can exist in an oscillation of the Coriolis measuring tubes that forms only one anti-node and a second eigenform in the oscillation of the Coriolis measuring tubes can exist in which additionally a central node of the oscillation is formed. The number of oscillation drivers 3a, 3b, 3c and oscillation sensors 4a, 4b, 4c is, in general, solely dependent on which eigenform the oscillation of the Coriolis measuring tubes—or the Coriolis measuring tube—is to be able to be excited and able to be observed. The arrangement shown in FIG. 1 enables, at any rate, the Coriolis measuring tubes to be excited to a first eigenform and a second eigenform of the oscillation and for these oscillations to be observed.

The process exists here in a flow of media (explicitly not shown) that flows through the oscillation elements 2a, 2b formed as Coriolis measuring tubes and, due to the Coriolis effect, is interactive with the resonance measuring system 1, namely, influences the oscillation elements 2a, 2b. The mass flow can be determined by measuring a difference in time of the oscillations in the respective eigenform in the upstream and downstream area of the oscillation elements 2a, 2b. Excitation of the oscillation elements 2a, 2b via the oscillation driver 3a, 3b, 3c using a known excitation signal $F_i(t)$ occurs advantageously with the eigenfrequency of the first eigenform of the resonance measuring system since, there, the least amount of energy is needed to maintain the oscillation while having a maximum amplitude of the oscillation.

The eigenfrequency of the resonance measuring system 1 interactive with the process is, thus, of interest because more extensive information about the resonance measuring system 1 is contained in the eigenfrequency. In the Coriolis mass flowmeter shown in FIG. 1, this is, e.g., the density of the media flowing through the oscillation elements 2a, 2b. When the eigenfrequency of the resonance measuring system 1 is known, valuable additional process information can be obtained.

A further excitation of the resonance measuring system 1 or, respectively the oscillation elements 2a, 2b results—intended or not—from the process itself, wherein a part of the excitation can be expressed by unknown excitation signals $W(t)$. The oscillations of the oscillation elements 2a, 2b are detected by the oscillation sensor 4a, 4b, 4c and are presented as a response signal $y_i(t)$, usually in the form of an electric signal.

All in all, it is problematic in resonance measuring systems that the eigenfrequencies $f_{0i}$, important for operation for the above-mentioned reasons, are dependent upon different factors and can possibly change abruptly. In this respect, operational conditions for Coriolis mass flowmeters are particularly challenging in, for example, unsteady or multi-phase flow, start-up procedures, switching operations in valves, etc. The abrupt change of the eigenfrequency of the resonance measuring system 1 can lead to the working point of the resonance measuring system 1 being lost and then being found again and corrected only after a comparatively long start-up or, respectively correcting procedure. Up to this point, the resonance measuring system 1 does not produce any reliable, utilizable results.

In FIG. 1, in addition to the structure of the Coriolis mass flowmeter, an implied spring-mass equivalent circuit of the resonance measuring system 1 formed as a Coriolis mass flowmeter is superimposed. The masses of the oscillation elements 2a, 2b of the merging flanges are implied and the resilient couplings of the masses with one another are symbolized by spring damping elements. The spring-mass equivalent circuit of the resonance measuring system 1 implied in FIG. 1 is clearly shown in FIG. 2 with formula symbols.

In FIG. 1, it is implied by the signal line provided with a sense of direction that the known excitation signals $F_i(t)$ and the response signals $y_i(t)$ generated by the oscillation sensor can be exchanged between a central control unit of the resonance measuring system 1 not described in detail here and the oscillation drivers 3a, 3b, 3c, on the one hand, and the oscillation sensors 4a, 4b, 4c, on the other hand.

The idea according to the invention involves evaluating the components in the response signal $y_i(t)$ resulting from the different excitations of the oscillation element 2a, 2b and using them as the basis for independently determining a value for the eigenfrequency $f_{0i}$ of interest, wherein the different dynamic characteristics of such information sources made usable are combined so that an eigenfrequency $f_{0i}$ of the resonance measuring system 1 that changes very quickly can also be corrected, even under operational conditions of resonance measuring systems that have proven to be extremely problematic to date.

Concretely, this is realized in that orthogonal projection components $Re\{y_i\}, Im\{y_i\}$ of the response signal are created by projecting the response signal $y_i(t)$ onto an orthogonal frame of reference, at least a first value corresponding to the eigenfrequency of the resonance measuring system 1 is determined with at least a part of the alternating components of the projection components $Re\{y_i\}, Im\{y_i\}$, and the first value corresponding to the eigenfrequency $f_{0i}$ of the resonance measuring system 1 is used for exciting the resonance measuring system 1 with a first control in a first control loop 5 in the correspondent eigenform and at least a second value corresponding to the eigenfrequency $f_{0i}$ of the resonance measuring system 1 is determined with at least a part of the constant components of the projection components $Re\{y_i\}$, $Im\{y_i\}$ and the second value corresponding to the eigenfrequency $f_{0i}$ of the resonance measuring system 1 is used for exciting the resonance measuring system 1 with at a second control in a second control loop 6 in the eigenform corresponding to the eigenfrequency $f_{0i}$. Thus, at least two control loops 5, 6 exist, which realize a control of the resonance measuring system 1 at the possibly time-variant value for the eigenfrequency $f_{0i}$ of the respective eigenform of the resonance measuring system 1.

Figure 3:
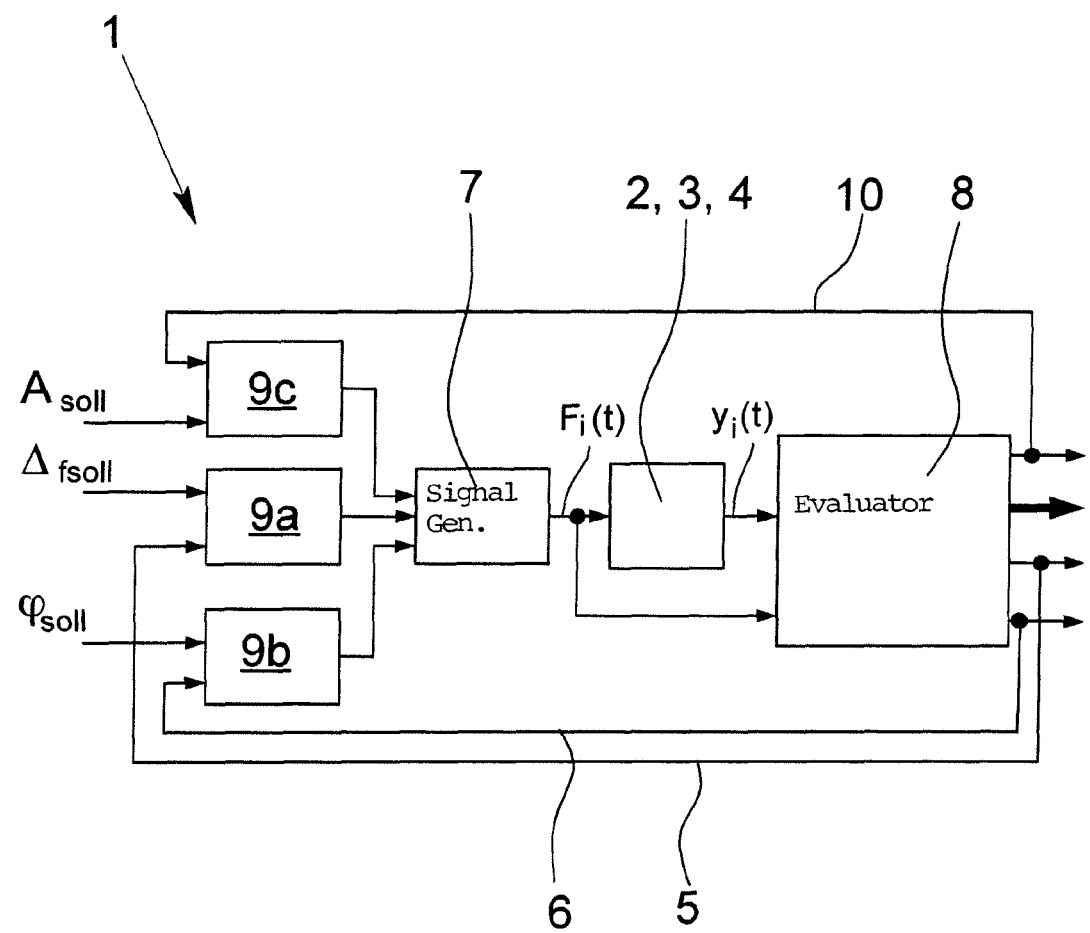
FIG. 3 is a schematic depiction of the method according to the invention for operating a resonance measuring system in the form of a block diagram.

In FIG. 3, a resonance measuring system 1 is shown as a block diagram having a control of the oscillation of the oscillation element 2 at the eigenform of a first eigenfrequency. The section excited by the excitation signal $F_i(t)$ consists, here, of the oscillation element 2, the oscillation drivers 3 and the oscillation sensors 4, which are shown in a block. In a signal generator 7, the known excitation signal $F_i(t)$ of the respective eigenform is generated, namely from the signals of the controllers 9a, 9b, 9c. For a control of the resonance measuring system at a further eigenform, the control loop shown in FIG. 3 should be built separately, so that a further known excitation signal of the additional eigenform is generated in a further signal generator, namely from the signals of further controllers.

The determination of the first value and the second value for the eigenfrequency $f_{0i}$ of the resonance measuring system 1 is obtained from the response signal $y_i(t)$ in the evaluator 8, in which the actual method in question for operating a resonance measuring system 1 is realized. In the implementation of the method realized by the evaluator 8, the first control and the second control are employed competitively and complementarily, so that the process variables contained in the value for the eigenfrequency $f_{0i}$ can be quickly determined and the resonance measuring system 1 can quickly be directed to the working point given by the value determined for the eigenfrequency $f_{0i}$.

In the resonance measuring system 1 shown in FIG. 3, the values of the eigenfrequencies $f_{0i}$ of the respective eigenform are determined based on a model from the projection components $Re\{y_i\}, Im\{y_i\}$ of the response signal $y_i(t)$ in the evaluator 8, wherein the mathematical description of the resonance measuring system 1 has already taken place in the general part of the description and has already found its deposition in Equation 3. Equation 3 shows a general case of two coupled equations of motion of a Coriolis measuring tube that is excited in two eigenforms.

Figure 2:
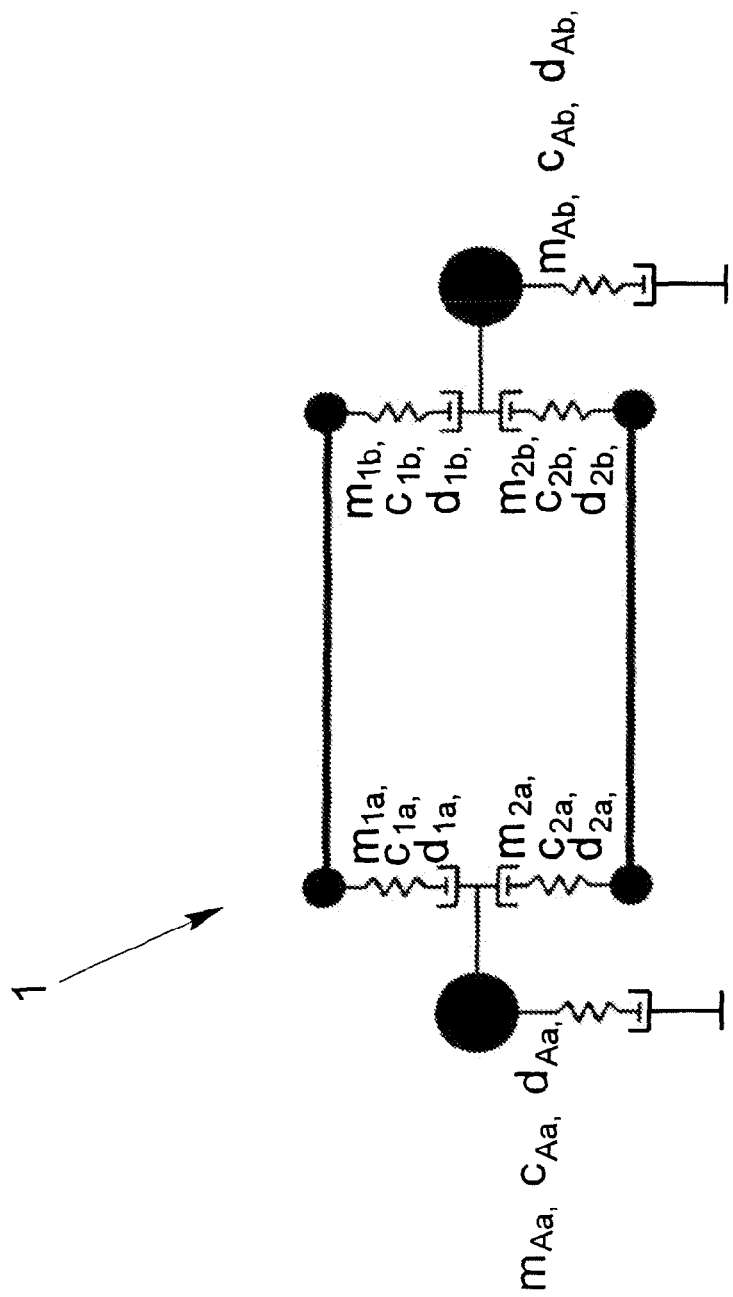
FIG. 2 is a mechanical equivalent circuit diagram having concentrated parameters in the form a spring-mass system of the Coriolis mass flowmeter shown in FIG. 1.

The oscillation behavior can be described on the basis of a model having concentrated equivalent elements according to Equation 3 and FIG. 2. The equivalent elements with the index $1x$, thus, describe the effective operative masses, springs and dampers of the first measuring tube, the elements with the index $2x$, the respective parameters of the second measuring tube. The equivalent elements for masses, springs and dampers labeled with the index A describe the equivalent elements of the connection flange, i.e. the attachment. The indices a and b respectively represent the left, or respectively, the right half of the measuring tube. An oscillation in the first eigenform in this model corresponds to the equiphase, translatory movement of the masses of the measuring, or respectively, carrier tubes. A rotation of the masses at the central point of the measuring tubes corresponds to an oscillation in the second eigenform.

In the resonance measuring system 1 according to FIG. 3, a respective second order linear differential equation is used as a model of the eigenform of the oscillation elements 2a, 2b, wherein a harmonic oscillation with an excitation frequency $f_i$ is used as a known excitation signal $F_i(t)$, wherein the unknown excitation signal $W(t)$, which is created by the process itself, is assumed as white noise, and wherein simplified as a model for the response signal $y_i(t)$ of the respective eigenform, the relation according to Equation 12 is used as a speed signal, which has already been described in detail in the general description.

In the resonance measuring system 1 according to FIG. 3, harmonic oscillations shifted by 90° are used as an orthogonal frame of reference for the projection of the response signal $y_i(t)$, with which the response signal $y_i(t)$ is multiplied for obtaining the orthogonal projection components $Re\{y_i\}$, $Im\{y_i\}$. The known excitation signal $F_i(t)$ is used as one of the harmonic oscillations, wherein a description of the projection components $Re\{y_i\}, Im\{y_i\}$ according to Equations 13 and 14 of the general description results.

The evaluator 8 according to FIG. 3 carries out an appropriate high-pass filtering and low-pass filtering of the projection components $Re\{y_i\}, Im\{y_i\}$ of the response signal $y_i(t)$, so that respectively an alternating component of the projection components $Re\{y_i\}, Im\{y_i\}$ is obtained, the phase difference $\phi_{Pro}$ of the pointer S described by the alternating components of the projection components $Re\{y_i\}, Im\{y_i\}$ is determined between at least two time terms $t_1$, $t_2$ and the eigenfrequency $f_{0i}$ of the respective eigenform of the resonance measuring system 1 is defined with the determined phase difference $\phi_{Pro}$, namely in accordance with formula relation from Equation 15. This method using the evaluation of the of the alternating components of the projection components $Re\{y_i\}, Im\{y_i\}$ thus allows a direct determination of the eigenfrequency and results from the wide-band excitation of the resonance measuring system 1 via process noise, which is modeled as white noise in the presented model. Since the resonance measuring system 1 or, respectively, the oscillation elements 2a, 2b exhibits or, respectively, exhibit the behavior of a bandpass with passage in the range of the resonance frequency, the value of the present eigenfrequency $f_{0i}$ of the resonance measuring system 1 can be determined quickly and directly over the entire frequency range. As a result, the first control loop 5 is designed as a frequency control loop.

Another design of the evaluator 8 provides that the frequency control loop nullifies the control deviation given by Equation 16, and in the process, functions with an approximation determination of the phase difference. In the corrected state, the initially accepted error of the control due to the control deviation being nullified is also null.

It is further provided in the evaluator 8 according to FIG. 3 that a respective constant component of the projection components $Re\{y_i\}, Im\{y_i\}$ is obtained by low-pass filtering of the projection components $Re\{y_i\}, Im\{y_i\}$ of the response signal $y_i(t)$ and the phase difference $\phi_P$ is nullified via the excitation frequency $f_i$ by the second control loop 6 designed as a phase control loop, whereby, inevitably, the excitation frequency $f_i$ corresponds to the eigenfrequency $f_{0i}$ of the resonance measuring system 1. The second control loop 6 operates parallel to the first control loop 5.

As can be seen in FIG. 3, a third control loop 10 is provided, which adjusts the amplitude of the oscillation of the oscillation elements 2a, 2b at a given value, so that the oscillation has enough magnitude for achieving the desired effects. This control simultaneously prevents that the resonance measuring system 1 or, respectively, the oscillation elements 2a, 2b are overexcited, whereby, for example, damage of the oscillation elements 2a, 2b designed as Coriolis measuring tubes is prevented.

The controllers 9a, 9b, 9c shown in FIG. 3 can be designed according to any method appearing to be suitable, it could be a classic controller, state regulator, or other controller.

As opposed to the first control loop 5, in which frequency control is implemented, the phase control of the second control loop 6 depends on the evaluation of the constant components of the projection components $Re\{y_i\}, Im\{y_i\}$ of the response signal $y_i(t)$, wherein a good sensitivity of the method is only present in the resonance range of the resonance measuring system 1. The evaluation realized here is based on knowledge that the response signal $y_i(t)$ is phase-shifted to the known excitation signal $F_i(t)$, wherein the phase shift is dependent on the frequency gap of the excitation signal $F_i(t)$ to the eigenfrequency of the resonance measuring system 1; this is known from the transmission behavior of systems that are capable of being oscillated, i.e., systems of at least second order. In order to find the resonance frequency $f_{0i}$ of the resonance measuring system 1, the resonance measuring system 1 is excited at a single frequency, wherein each frequency needs to find an application on the resonance measuring system 1 for a certain time, so that a quasi-stationary state is set. The rate of change of the frequency may not exceed an upper limit, since; otherwise, the phase measurement is distorted.

Figure 4:
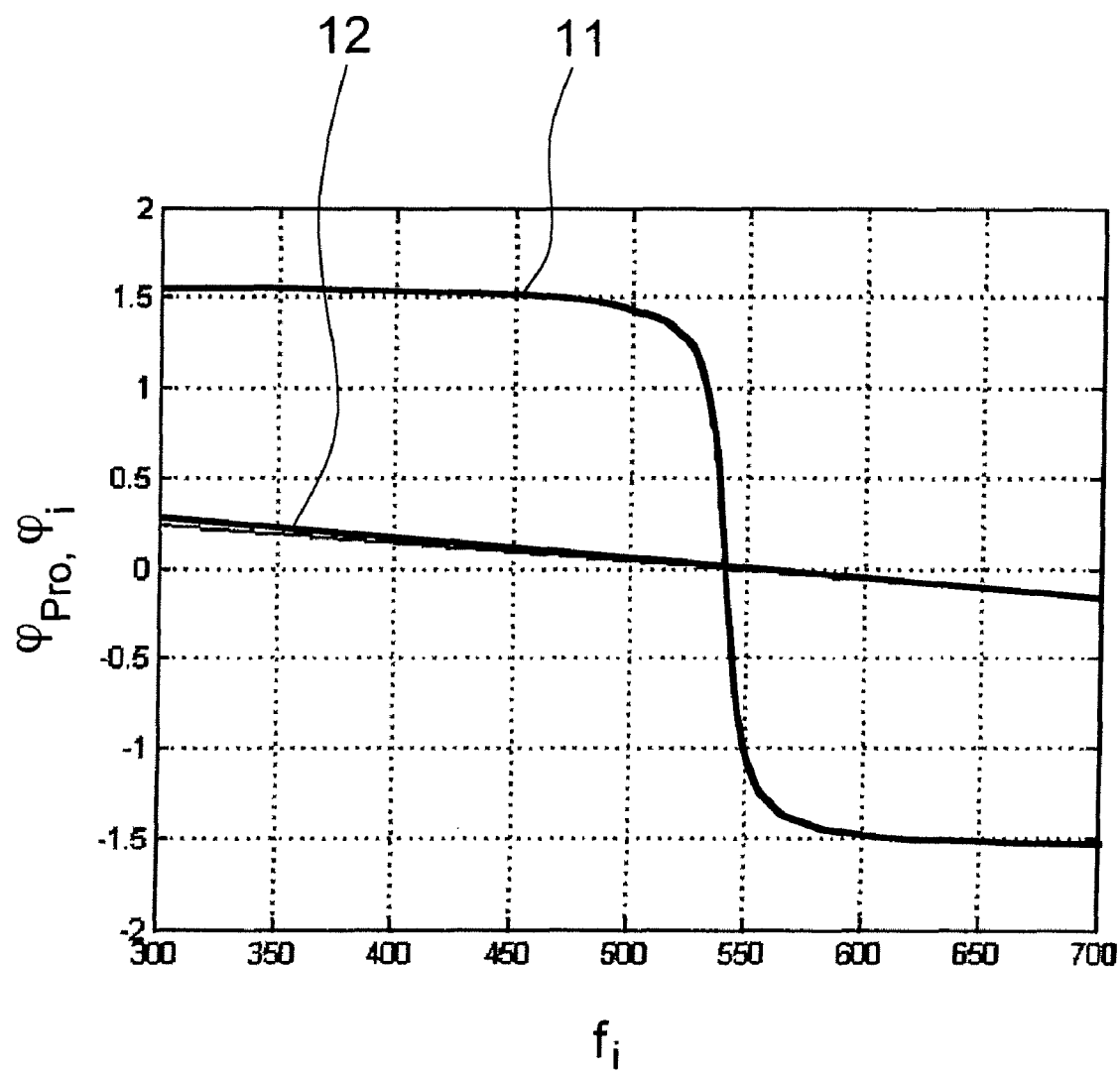
FIG. 4 is plot of the phase difference after the direct and indirect method via the excitation frequency.

Relating to changing excitation frequencies, a system that is capable of oscillating—such as the resonance measuring system 1—exhibits a great change of the phase difference only in the resonance range, which is shown in FIG. 4. Here, curve 11 shows the phase difference via the excitation frequency $f_i$ between excitation signal $F_i(t)$ and response signal $y_i(t)$ and curve progression 12 documents the constant sensitivity over the entire frequency range when evaluating the alternating components of the projection components $\operatorname{Re}\{y_i\}$, $\operatorname{Im}\{y_i\}$ of the response signal $y_i(t)$. In the resonance measuring system 1 according to FIG. 3, it is thus provided that, in generating the excitation signal $y_i(t)$, the control loop 5, 6 is decisive that has the greater sensitivity in the respective frequency range. That means that the first control loop 5 is decisive outside of the resonance range of the resonance measuring system 1 and the second control loop 6 within the resonance range of the resonance measuring system 1. This occurs, here, in that the controlling variables of the first control loop 5 and the second control loop 6 are combined by the signal generator 7, in this case by creating a summation signal from the correcting variables. The amplitude can, then, be adjusted additionally and independent of the frequency information.

What is claimed is:

1. Method for operating a resonance measuring system having at least one oscillation element, at least one oscillation driver and at least one oscillation sensor, wherein the oscillation element, comprising the steps of:
using by the oscillation driver to excite the oscillation element to oscillation in at least one eigenform with known excitation signals $F_i(t)$ and exciting the oscillation element to oscillation with unknown excitation signals $W(t)$ by a process being measured and
detecting the oscillations of the oscillation element with the oscillation sensor and forming the oscillations detected into at least one response signal $y_i(t)$ of the respective eigenform;
wherein orthogonal projection components ($\operatorname{Re}\{y_i\}$, $\operatorname{Im}\{y_i\}$) of the response signal are created by projecting the response signal $y_i(t)$ onto an orthogonal frame of reference, wherein at least a first value corresponding to the eigenfrequency $f_{0i}$ of the resonance measuring system is determined with at least a part of alternating components of the projection components ($\operatorname{Re}\{y_i\}$, $\operatorname{Im}\{y_i\}$), wherein at least a second value corresponding to the eigenfrequency $f_{0i}$ of the resonance measuring system is determined with at least a part of constant components of the projection components ($\operatorname{Re}\{y_i\}$, $\operatorname{Im}\{y_i\}$), and wherein the determined first and second values corresponding to the eigenfrequency $f_{0i}$ of the resonance measuring system are used for exciting the resonance measuring system with at least one control in at least one control loop in a eigenform corresponding to the eigenfrequency $f_{0i}$.

2. Method according to claim 1, wherein the determined first value corresponding to the eigenfrequency $f_{0i}$ is used for exciting the resonance measuring system with a first control in a first control loop in the corresponding eigenform, and wherein the second determined value corresponding to the eigenfrequency $f_{0i}$ is used for exciting the resonance measuring system with a second control in a second control loop in the corresponding eigenform.

3. Method according to claim 2, wherein the first control and the second control are employed at least one of competitively and complementarily so that the process variables contained in the value for the eigenfrequency $f_{0i}$ are determined.

4. Method according to claim 2, wherein the first control and the second control are used to lead the resonance measuring system to a working point given by the value determined for the eigenfrequency $f_{0i}$.

5. Method according to claim 2, wherein the first control loop is formed as a frequency control loop and the control deviation $$f_{0i} = f_i + \frac{1}{2\pi(t_1 - t_2)} \arctan\left(\frac{\operatorname{Im}\{y_{iw}(t_1)\} \cdot \operatorname{Re}\{y_{iw}(t_2)\} - \operatorname{Re}\{y_{iw}(t_1)\} \cdot \operatorname{Im}\{y_{iw}(t_2)\}}{\operatorname{Re}\{y_{iw}(t_1)\} \cdot \operatorname{Re}\{y_{iw}(t_2)\} + \operatorname{Im}\{y_{iw}(t_1)\} \cdot \operatorname{Im}\{y_{iw}(t_2)\}}\right)$$

is nullified or, using the approximation $\arctan(x)=x$, the following control deviation $$f_{0i} - f_i = \frac{1}{2\pi(t_1 - t_2)} \cdot \frac{\operatorname{Im}\{y_{iw}(t_1)\} \cdot \operatorname{Re}\{y_{iw}(t_2)\} - \operatorname{Re}\{y_{iw}(t_1)\} \cdot \operatorname{Im}\{y_{iw}(t_2)\}}{\operatorname{Re}\{y_{iw}(t_1)\} \cdot \operatorname{Re}\{y_{iw}(t_2)\} + \operatorname{Im}\{y_{iw}(t_1)\} \cdot \operatorname{Im}\{y_{iw}(t_2)\}}$$

is nullified.

6. Method according to claim 2, wherein a respective constant component of the projection components ($\operatorname{Re}\{y_i\}$, $\operatorname{Im}\{y_i\}$) is obtained by low-pass filtering of the projection components ($\operatorname{Re}\{y_i\}$, $\operatorname{Im}\{y_i\}$) of the response signal $y_i(t)$, wherein the phase difference $\phi$ of the response signal $y_i(t)$ is obtained through the constant components of the projection components ($\operatorname{Re}\{y_i\}$, $\operatorname{Im}\{y_i\}$) and the phase difference $\phi$ is nullified via the excitation frequency $f_i$ by the second control loop, the second control loop being a phase control loop, so that the excitation frequency $f_i$ is the eigenfrequency $f_{0i}$ of the resonance measuring system.

7. Method according to claim 2, wherein, by the generation of the excitation signal $F_i(t)$, the one of the first and second control loops that has a greater sensitivity in the respective frequency range is decisive in that the first control loop is controlling outside of the resonance range of the resonance measuring system and the second control loop is controlling inside of the resonance range of the resonance measuring system.

8. Method according to claim 7, wherein the correcting variables of the first loop and second control loops are combined by a signal generator by different functions and by creating a summation signal from the correcting variables.

9. Method according to claim 1, wherein the determined first value corresponding to the eigenfrequency $f_{0i}$ is used for exciting the resonance measuring system with a first control in a first control loop in the corresponding eigenform, and wherein the second determined value corresponding to the eigenfrequency $f_{0i}$ is used for exciting the resonance measuring system with a second control in a second control loop the control is a multivariable control.

10. Method according to claim 1, wherein the value for the eigenfrequency of the respective eigenform of the resonance measuring system is determined from a correcting variable of the resonance measuring system.

11. Method according to claim 1, wherein the value of the eigenfrequency $f_{0i}$ of the respective eigenform is determined based on a model from the projection components ($\operatorname{Re}\{y_i\}$, $\operatorname{Im}\{y_i\}$) of the response signal $y_i(t)$.

12. Method according to claim 11, wherein a second order linear differential equation is used as a model of the respective eigenform of the oscillation element, wherein a harmonic oscillation with an excitation frequency $f_i$ is used as a known excitation signal $F_i(t)$ of the respective eigenform, wherein the unknown excitation signal $W(t)$ is assumed to be white noise, wherein, simplified as a model for the response signal $y_i(t)$ of the respective eigenform, the following relation is used as a speed signal of the oscillation:

$$y_i(t) = A_i \sin(\omega_i t + \phi_i) + B_i \cdot e^{-\omega_{0i} D_i t} \cdot \sin(\omega_{0i} t) + B_{iPro} \sin(\omega_{0i} t).$$

13. Method according to claim 1, wherein two harmonic oscillations shifted by 90° are used as an orthogonal frame of reference of the respective eigenform with which the response signal $y_i(t)$ is multiplied for obtaining the orthogonal projection components $(Re\{y_i\}, Im\{y_i\})$, wherein one of the harmonic oscillations is the known excitation signal $F_i(t)$, and wherein the projection components $(Re\{y_i\}, Im\{y_i\})$ can be described by:

$$y_i(t)\sin(\omega_i t) = Re\{y_i\}$$
$$= \frac{A_i}{2}[\cos(\varphi_i) - \cos(2\omega_i t + \varphi_i)] +$$
$$\frac{(B_i e^{-\omega_{0i} D_i t} + B_{iPro})}{2}$$
$$[\cos(\omega_{0i} - \omega_i)t - \cos(\omega_{0i} + \omega_i)t]$$

$$y_i(t)\cos(\omega_i t)$$
$$= Im\{y_i\}$$
$$= \frac{A_i}{2}[\sin(\varphi_i) + \sin(2\omega_i t + \varphi_i)] +$$
$$\frac{(B_i e^{-\omega_{0i} D_i t} + B_{iPro})}{2}$$
$$[\sin(\omega_{0i} - \omega_i)t + \sin(\omega_{0i} + \omega_i)t].$$

14. Method according to claim 1, wherein, respectively, an alternating component of the projection components $(Re\{y_i\}, Im\{y_i\})$ is obtained by at least one of high-pass filtering and low-pass filtering of the projection components $(Re\{y_i\}, Im\{y_i\})$ of the response signal $y_i(t)$, wherein the phase difference $\phi_{Proi}$ of a pointer described by the alternating components of the projection components $(Re\{y_i\}, Im\{y_i\})$ is determined between at least two time terms $t_1$, $t_2$ and wherein the eigenfrequency $f_{0i}$ of the resonance measuring system is defined with the determined phase difference $\phi_{Proi}$, in accordance with the relationship:

$$f_{0i} = f_i + \frac{1}{2\pi(t_1 - t_2)}\arctan\left(\frac{Im\{y_{iw}(t_1)\} \cdot Re\{y_{iw}(t_2)\} - Re\{y_{iw}(t_1)\} \cdot Im\{y_{iw}(t_2)\}}{Re\{y_{iw}(t_1)\} \cdot Re\{y_{iw}(t_2)\} + Im\{y_{iw}(t_1)\} \cdot Im\{y_{iw}(t_2)\}}\right).$$

15. Method according to claim 1, wherein a respective constant component of the projection components $(Re\{y_i\}, Im\{y_i\})$ is obtained by low-pass filtering of the projection components $(Re\{y_i\}, Im\{y_i\})$ of the response signal $y_i(t)$, wherein the phase difference $\phi_p$ of the response signal is obtained through the constant component of the projection components $(Re\{y_i\}, Im\{y_i\})$ and wherein a value of the eigenfrequency $f_{0i}$ of the resonance measuring system is obtained from the phase shift $\phi_i$, from the relations:

$$Re\{y_{iG}\} = \frac{A_i}{2}\cos\varphi_i \text{ and } Im\{y_{iG}\} = \frac{A_i}{2}\sin\varphi_i,$$
$$\varphi_i = \arctan\left(\frac{Im\{y_{iG}\}}{Re\{yiG\}}\right) = \frac{\pi}{2} - \arctan\left(\frac{2\omega_{0i} D_i \omega_i}{\omega_{0i}^2 - \omega_i^2}\right).$$

16. Method according to claim 1, wherein the amplitudes of the oscillations of the oscillation elements are adjusted at a given value by a third control loop.

17. Method according to claim 1, wherein, for controlling the resonance measuring system, a separate control loop is provided for each individual eigenform, a first control loop and a second control loop being used separately.

18. Method according to claim 1, wherein the resonance measuring system controlled comprises a Coriolis mass flowmeter.

19. Resonance measuring system, comprising:
at least one oscillation element which is excitable to oscillation with unknown excitation signals $W(t)$ by a process being measured,
at least one oscillation driver with which the oscillation element is excitable to oscillate in at least one eigenform with known excitation signals $F_i(t)$, at least one oscillation sensor with which oscillations of the oscillation element are detectable and formed into at least one response signal $y_i(t)$ of the respective eigenform, and
an evaluator with which orthogonal projection components $(Re\{y_i\}, Im\{y_i\})$ of the response signal are created by projecting the response signal $y_i(t)$ onto an orthogonal frame of reference, at least a first value corresponding to the eigenfrequency $f_{0i}$ of the resonance measuring system is determined with at least a part of alternating components of the projection components $(Re\{y_i\}, Im\{y_i\})$, at least a second value corresponding to the eigenfrequency $f_{0i}$ of the resonance measuring system is determined with at least a part of constant components of the projection components $(Re\{y_i\}, Im\{y_i\})$, and the determined first and second values corresponding to the eigenfrequency $f_{0i}$ of the resonance measuring system are used for exciting the resonance measuring system with at least one control in at least one control loop in an eigenform corresponding to the eigenfrequency $f_{0i}$.

20. The resonance measuring system according to claim 19, comprises a Coriolis mass flowmeter.

* * * * *